Figure 1:
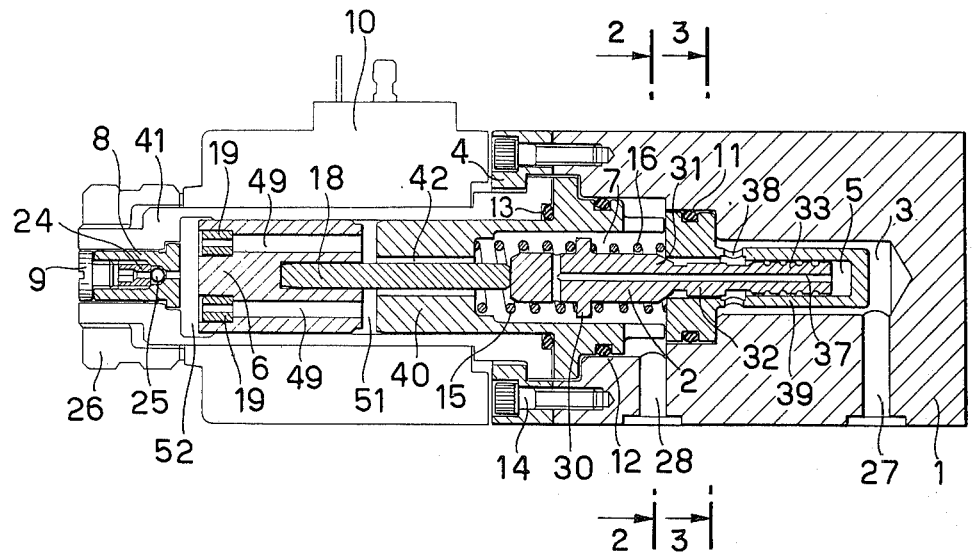

United States Patent [19]
Tirelli

[11] 3,945,399
[45] Mar. 23, 1976

[54] ELECTRICALLY MODULATED HYDRAULIC-PRESSURE REGULATING VALVE

[75] Inventor: Paolo Tirelli, Cinisello Balsamo (Milan), Italy

[73] Assignee: Atos Oleodinamica S.p.A., Milan, Italy

[22] Filed: June 17, 1974

[21] Appl. No.: 480,162

[30] Foreign Application Priority Data
Apr. 11, 1974  Italy .................................. 21259/74

[52] U.S. Cl. ............................... 137/529; 251/129
[51] Int. Cl.² ........................................ F16K 31/10
[58] Field of Search .............. 137/528, 529; 251/129

[56] References Cited
UNITED STATES PATENTS

| | | | |
|---|---|---|---|
| 2,727,529 | 12/1955 | Kodet | 137/529 X |
| 2,980,139 | 4/1961 | Lynn | 251/129 X |
| 3,632,081 | 1/1972 | Evans | 251/129 |
| 3,732,893 | 5/1973 | Ziesche et al. | 251/129 X |
| 3,765,644 | 10/1973 | Zevner | 251/129 |

Primary Examiner—Robert G. Nilson
Attorney, Agent, or Firm—Diller, Brown, Ramik & Wight

[57] ABSTRACT

This disclosure relates to a electrically modulated regulation valve for hydraulic systems, said valve essentially comprising a slider-shutter of complex shape, whose length is considerable with respect to its diameter and is housed, along an appreciable fraction of its length, in an outflow channel, the latter being cylindrical with two different internal diameters and offering a guiding surface for the slider-shutter. The slider-shutter has a prolonged conical portion from which a cylindrical rod extends, having properly shaped projections which act as guiding members. The advantage achieved is a most accurate regulation of the hydraulic pressure.

27 Claims, 5 Drawing Figures

ELECTRICALLY MODULATED HYDRAULIC-PRESSURE REGULATING VALVE

This invention relates to pressure regulators for fluid-dynamic controls of the continually actuated by a variable-intensity electric signal and, more particularly to, valves in which the regulation of hydraulic flow is carried out by means of a slider which acts as a shutter and which is properly positioned by control members so as partially to close a passageway port and, consequently to impress a continuously adjustable pressure drop on the flow which passes through said port: such slider being capable of assuming a number of stable positions due to the combined action of the hydraulic flow, of a properly energized electromagnetic member, and of two springs. Such a regulator will be called hereinafter an electrically modulated hydraulic-pressure regulating valve.

For fluid-dynamic controls (hydraulic and oil-type) it is intended that a control be effected by any appropriate liquid fluid, other than oil, providing that it has certain lubricating properties, and more particularly by nonflammable synthetic liquids (phosphoric esters and/or chlorinated hydrocarbons), synthetic liquids in general, mixtures of water and glycols, oil-water mixtures and the like.

The possibility of modulating the hydraulic magnitudes in a continuous manner permits one to achieve functional and operative improvements in all the machinery and apparatus which use the hydraulic approach for their operability. In addition, it is important that the variation might be obtained by acting upon the valve by means of a variable electric signal, since the electric signal can conveniently be produced by automatic electric and/or electronic systems.

The electrically modulated hydraulic regulating valve, which is the subject of the present invention, exploits, to effect the regulation of fluid pressure, the known principle of the conical shutter acting on a planar seat, the thrust which is required to balance the hydraulic force being supplied by an electromagnet which is capable of producing a thrust which is proportional to the current flowing through the coil thereof. By so regulating the current flowing through the electromagnet's coil, the thrust on the shutter is adjusted and concurrently the pressure drop impressed on the fluid flow running about the shutter, or, as an alternative, the flow is impeded by closing the shutter against its seat. The regulating valve according to the present invention distinguishes over the conventional constructional arrangements in the shape of the slider-shutter and the special electromagnetic member which acts, with a thrust action, upon said slider-shutter.

The electrically modulated hydraulic regulators as conventionally known up to now are essentially formed by a shutter of conical shape whose front portion (sharp portion of the cone) occupies a circular cylindrical channel whose diameter is generally equal to about the average diameter of the cone. Through said channel the pressurized fluid flows and thus impresses a thrust with an axial resultant on the front portion of the shutter. This thrust is balanced by the action of an electromagnetic member which, through appropriate mechanical intermediates, imparts to the rear portion of the shutter an axial thrust directed in the opposite direction. These mechanical intermediates are generally formed by a cylindrical rod which is integral with the rear portion of the shutter which, thus, has a general mushroom-like shape.

Inasmuch as the shutter (movable portion) can slide relative to the channel under the action of the hydraulc thrust and the urge of the electromagnetic thrust means, the channel being a part of the valve body (fixed portion), the shutter must have mechanical guides which may include the rod, which is the shutter's stem, sliding over appropriate fixed supporting members. Generally, the rod is contained within a hollow cylindrical body having an appropriate length.

The drawbacks of such an approach are numerous and are essentially connected with the shape and mode of guiding the rod-shutter member; this member, in fact, has a very elongate shape with a conically shaped extension in its distal portion.

The position of the shutter is a result of the balance between the force originated by the hydraulic pressure acting upon the lateral surface of the cone (action) and the force as generated by the electromagnet (reaction) against said first-named force.

Since the thrust cross-section against which the hydraulic pressure is active is considerable, the thrust force can take, when operating with high pressures, very high magnitudes and thus the electromagnetic member is required to supply a considerably high thrust.

The shutter-rod assembly is subjected to high compressive stresses which could cause detrimental bendings of the rod, with the result being distributed along the guiding member. In addition, the bending of the rod causes the misalignment of the cone relative to the channel axis so that sliding of the cone during its axial motion may occur.

The above indicated approach for guiding the rod makes it difficult to achieve a satisfactory alignment between the guide, the rod and the channel and, in addition, compels the cone to work in a cantilever fashion according to a configuration which is incapable of withstanding radial resultant forces, so that the cone is exposed to vibrations a direction perpendicular to its own axis.

No means have been provided for stabilizing the rod-shutter assembly in order to dampen the vibrations in the axial direction and this results variations in the flow section for the fluid and pressure pulsations. The regulation is thus inaccurate and the material of the shutter becomes weakened and worn out within a comparatively short time.

An object of the present invention is to provide an electrically modulated hydraulic regulator which does away with the above enumerated constructional and functional defects and affords a number of other advantages.

The regulation valve in question, to this purpose, is characterized in that it comprises a slider-shutter having a complex shape, a length which is considerable with respect to the diameters and such as to permit the housing thereof, along a considerable fraction of its length, in the outflow channel which has a circular cylindrical shape with two slightly different diameters and which channel is also the guiding member in which the slider-shutter can be supported for sliding movement.

The slider-shutter is essentially constituted by a conical member which is extended, in its peak portion, by a concentric rod which has projections of an appropriate shape, these projections contacting the internal surface of the outflow channel and acting as guiding members.

Inasmuch as one of the guiding members is made in the shape of a piston which slides, in a pressure-tight manner, within the outflow channel in the lesser-diameter area, between said piston-like member and the conical shutter member which is present in the larger-diameter area, a chamber is formed in which there is fluid under pressure. The pressure, by acting on both of the closure walls of said chamber, generates thrusts whose resultant forces are coaxial, directed in opposite directions and impressing a stretching action upon the slider-shutter body in the area disposed between the shutter member and the piston-like guiding member.

This expedient is such that there cannot be generated, in the portion of slider-shutter body in which the guiding means are active, any compressive or bending force, and the thrust which is required of the electromagnetic member to balance the slider-shutter is very slight since it is proportional to the hydraulic pressure and only to the cross-sectional differential of the cross-sections of the outflow channel.

The slider-shutter body has such a shape that in its elongate portion, interposed between the shutter member and the piston-like guiding member, there is only a prismatic projection whose straight cross-section can exactly be inscribed in a circle having a diameter equal to the inside diameter of the outflow channel, and thus the prismatic member in question has more than one generating line (at least three) in contact with the inner surface of the outflow channel. Thus it forms the second guiding member for the slider-shutter member in its movement within the outflow channel.

This approach is such, by maintaining the slider constantly guided along two portions of a generating line placed at a considerable distance from one another, as to prevent the occurrence of movements or vibrations in a radial direction relative to the axis of the slider-shutter body.

The slider-shutter has means of its own for dampening possible vibrations in the axial direction, these means being embodied in a channel formed internally of the slider-shutter body and lying in an axial and concentrical direction and connecting two hydraulic chambers. Of these chambers, one is closed and its volume is varied as the position of the slider-shutter is varied.

The oil-bath electromagnetic member is of a special make: its movable magnetic armature, like a piston, slides in contact with the fixed cylindrical stator, the latter being lubricated by the same fluid which flows in the valve.

Said electromagnet is capable of providing a thrust which, within the displacements limits of the movable armature, is a function of the feeding current only, rather than the relative position of the movable armature, the latter, lastly, being equipped with two calibrated channels which are capable of affording an efficient dampening action of the axial vibrations to which the movable armature of the electromagnet is subjected.

On the slider-shutter two springs are active, which have the task of keeping the slider-shutter in a virtually no-load condition and the movable armature of the electromagnet in an optimum position preventing the movable armature from reaching the end of stroke and making possible in such a way a considerable promptness of the response as the regulating valve is energized.

The construction of the valve is such as to permit it to be adapted to a number of bodies by merely adding or modifying any detail component part.

A preferred embodiment of the present invention is described, for better clarity, by having reference to the accompanying drawings, wherein:

FIG. 1 is a longitudinal view of an electrically modulated hydraulic-pressure regulating valve clearly showing the hydraulic and mechanical details thereof.

Figure 2:
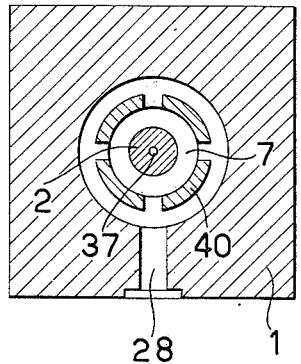
Figure 3:
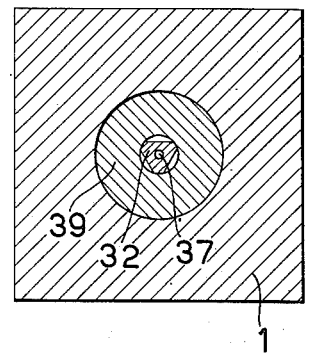

FIGS. 2 and 3 are cross-sectional views taken along the lines 2—2 and 3—3 of the hydraulic part of the valve of FIG. 1, respectively.

Figure 4:
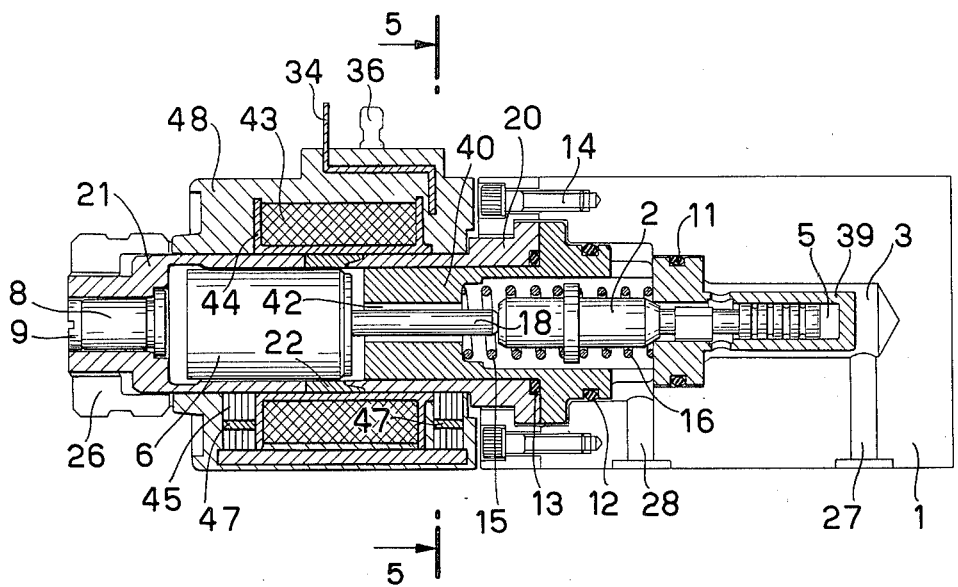
Figure 5:
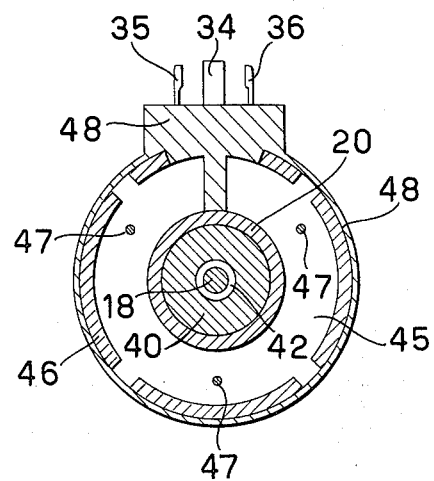

FIG. 4 is a in longitudinal view showing in detail the electromagnetic portion of a preferred embodiment of the valve, and FIG. 5 is a transverse cross-sectional view of the coil taken along the line 5—5 of FIG. 4.

Having now particular reference to FIG. 1, such a valve comprises a valve body 1 formed of alloyed cast iron and of parallelepipedal outline in which there are formed by machining and/or casting empty spaces of an appropriate shape. A slider-shutter 2, capable of assuming several positions relative to a seat 39 is inserted in a cylindrical hollow 3 formed axially in the valve body 1.

The seat 39 has a hollow round cylindrical shape made with two slightly different internal diameters and houses the slider-shutter 2.

The slider-shutter 2 has an intricate form and include a conical portion 31 and a cylindrical portion 33 provided with axially radial grooves. Between the portion 31 and the portion 33 there is an abutment 32 having a straight prismatic shape whose periphery is tangent to the larger internal diameter of the seat 39. Along the axis of the slider-shutter 2 a channel 37 is formed which hydraulically connects a chamber 5, as defined by the end of the slider-shutter and an end closure wall of the seat 39, with an outlet chamber 7.

The portion 33 of the slider-shutter 2 slides in contact with the inner wall of the seat 39 having the lesser diameter acting as a piston since for each position of the slider-shutter 2 the volume of the chamber 5 is varied and the slider-shutter carries out a pumping action so that some hydraulic fluid must flow, along the channel 37, from the chamber 5 to the chamber 7 and vice versa. The viscous friction associated with such a fluid flow have a stabilizing effect towards the axial displacements of the slider-shutter 2.

The hydraulic fluid under pressure enters the valve body 1 through the channel 27, fills the cylindrical space 3, passes into the empty space surrounding the seat 39, flows through the radial bores 38, overcomes the restricted area adjacent the abutment 32 and tries to emerge into the chamber 7 by sweeping the surface of the conical portion 31 which rests against the 90-degree edge of the seat 39. The hydraulic fluid which reaches the chamber 7 emerges from the valve body throuth the channel 28.

The hydraulic fluid under pressure which has reached the inner cavity of the seat 39 impresses axial thrusts on the slider-shutter and, since the conical portion 31 has,, a surface wider than that of the cylindrical portion 33 exposed to the pressure, these thrusts have a resultant which tends to separate the conical portion 31 from the seat 39.

The slider-shutter 2 which has long portions of generating lines of the parts 32 and 33 contacting the seat 39, is maintained in equilibrium against the hydraulic bias by the possible bias of the springs 15 and 16 acting thereupon by engaging the disc-like projection 30 and by the thrust exerted by the electromagnetic member on the slider-shutter 2 through the rod 18 which is connected with the magnetic armature 6.

The magnetic armature 6 slides within a pressure-tight cylinder 41 which houses in its end portion the magnetic counter-armature 40 having the shape of a solid of rotation and having a discontinuous surface engaging against the seat 39.

The pressure-tight cylinder 41 is fastened to the body 1 by a flange 4, tightened by the screws 14, which presses against a radial flange of the counter-armature 40 and the latter, in its turn, presses against the seat 39 which rests against the surfaces of the cavity of the body 1, a perfect alignment being thus obtained, along with the exact positioning, of the component parts 41, 6, 40, 39 and 2.

The sealing rings 11, 12 and 13, appropriately compressed into their seats prevent hydraulic fluid oozings through the contact surfaces between the body 1 and the parts 39, 40, 41.

The coil 10, which contains the electric energizing coilings, is slidably mounted on the cylinder 41 and is locked by the ferrule 26 which engages a screw-thread formed on the end shank of the cylinder 41.

The magnetic armature 6 has an essentially round cylindrical configuration and slides like a piston in the cylinder 41 thus defining the hydraulic chambers 51 and 52 which are mutually connected by axial bores 49 formed through the armature. The bores 49 can have restricted cross-section areas by applying restrictors 19 which are in the form of screw-threaded dowels each having a tiny calibrated bore.

Axially inserted in the armature 6 there is a thrust rod 18 which, passing through the bore 42 formed coaxially in the counter-armature 40, acts upon the end of the slider-shutter 2 which is in the chamber 7.

The hydraulic fluid, which is normally present in the chamber 7, fills the pressure-tight cylinder 41, flowing through the bore 42 and the bores 49.

In the end portion of the pressure-tight cylinder 41 there is formed the seat 8 defining a small vent valve. By releasing the sealing screw 9, accessed to the screw-threaded and bored dowel 24 can be obtained and by looseing the dowel 24 a way is provided for allowing compressed fluid present in the chamber 52 of the cylinder 41 to spurt out, thus ejecting air which possibly has been entrapped therein.

The screw-threaded and bored dowel 24 keeps the metal ball 25 in such a position as to close the channel 29 preventing the flow of the fluid to the outside when the dowel 24 has been completely tightened.

With particular reference to FIGS. 4 and 5 it can be seen that the component part 10, indicated as the coil, is substantially formed by an electric energizing coiling 43, contained in a supporting member 44 made of a stiff dielectric material; by two annular elements formed by shaped magnetic sheets 45, superposedly packed and fastened by rivets 47; a magnetic hood 46 of tubular form; and a conventional plastics material encapsulation 48.

The encapsulation 48 has the general form of a solid of rotation and has a planar projection on which the terminals 35, 36 of the electric coiling and the ground terminal 34 are housed.

The tube 46 has a longitudinal slit and the metal sheet packs 45, which peripherally contact the interior of the tube 46, have a radially oriented slot which, at the encapsulation stage, is filled by the plastics material 48.

The plastics material 48 has satisfactory dielectric properties, is heat-conductive and has favourable characteristics as to its mouldability either by injection or casting.

The special construction of the magnetic member is such that the axial thrust imparted by the slider-shutter 2 by agency of the rod 18 is substantially a function of the value of the ampere-turns flowing through the coiling 43 rather than of the relative position of the armature 6 and the counter-armature 40.

Having particular reference to FIG. 4, it can be seen, in fact, that the pressure-tight cylinder 41 is formed by three parts which are connected to each other either by welding or brazing, where the part 20 and the part 21 are of a magnetically active material and where the part 22 is of a magnetically inert material.

The part 22 is so shaped as to offer a longitudinal wall cross-section which is similar to a trapezium and is such that, associated with the part 20, a concentration of magnetic flux is obtained in the end tip of the part 20 said flux being linked with the armature 6. In addition, the armature 6 has, at its portion facing the counter-armature 40 and the part 20, a diameter reduction and an axial depth of the appropriate magnitude.

By sending electric current to the coiling 43, there is generated inside the cylinder 41 a magnetic field which attracts the armature 6 towards the counter-armature 40; the armature 6 thrusts to the right by the agency of the rod 18 the slider-shutter 2 which is thus enabled to overcome a possible hydraulic thrust in the axial direction which is impressed on its conical portion 31, thereby generating a restricted flow-passage area for the hydraulic fluid thus imparting a pressure drop thereto and performing the expected regulation which is essentially a function of the intensity of the current which flows through the coiling 43.

What is claimed is:

1. An electrically modulated hydraulic pressure regulating valve comprising a valve body, said body defining a cylindrical space closed at one end, at least one inlet port entering said space and at least one outlet port, a fixed valve member partially housed in said cylindrical space, said fixed valve member defining an elongated cylindrical cavity having two portions of slightly different internal diameters and said cavity being closed by a wall at the end of the portion having the lesser diameter, said fixed valve member having radial passageway ports establishing a communication between said cavity and said cylindrical space, a movable valve member in the form of a slider-shutter having a complex profile including as significant component parts a frustoconical portion and a round cylindrical projection having a plurality of annular grooves in the periphery thereof, said movable valve member being slidably housed in guided relation in said cylindrical cavity with said cylindrical projection cooperating as a piston in the lesser diameter portion of said cavity, said frustoconical portion being cooperable with said fixed valve member for closing said cylindrical cavity at the greater diameter end thereof, a pressure-tight cylinder formed of magnetically different parts, a movable magnetic armature mounted for axially sliding movement in contact with said pressure-tight cylinder and inside it, a magnetic counter-armature in the form of a hollow cylinder carried by said pressure tight cylinder and having a planar and non-continuous end surface bearing against said fixed valve member so as to define a chamber having an axial bore which allows a hydraulic fluid to flow between said chamber and said pressure-tight cylinder, a pusher in the form of a rod, connected to said movable magnetic armature, said pusher passing through said axial bore of said magnetic counter-armature and acting axially against said movable valve member, an electric coiling and a magnetic yoke surrounding said pressure-tight cylinder so that said movable magnetic armature undergoes an attraction force under the influence of a current flowing through said coiling, fastening means for securing said pressure-tight cylinder and said counter-armature to said valve body; and sealing means preventing oozings of hydraulic fluid between said fixed valve member, said counter-armature and said pressure-tight cylinder.

2. A hydraulic regulation valve according to claim 1, characterized in that said cylindrical space includes a major-diameter portion and a lesser-diameter portion, said fixed valve member has an external shape in the form of a solid of rotation with two diameters so as to be housed only partially in the lesser-diameter portion of said cylindrical space of said valve body, and said round cylindrical cavity lesser diameter portion extends about the two-thirds of its length and has a diameter of a ratio of about 11 to 12 with respect to the larger diameter portion of the cavity, said radial passageway ports opening into said cavity larger diameter portion, and said larger diameter portion terminating in a sharp edge with a 90° corner.

3. A hydraulic regulating valve according to claim 1, characterized in that said movable valve member round cylindrical projection has a length of about twice its diameter and said annular groove defines a plurality of radial cavities having the function of balancing channels for hydraulic support, said round cylindrical projection having a diameter equal to the lesser diameter of said round cylindrical cavity within which it slides and with which it cooperates to define within said cavity two chambers one of which is axially defined by said closure wall and the other is axially defined by said frustoconical portion of said movable valve member which rests against said sharp corner edge of said cylindrical cavity.

4. A hydraulic regulating valve according to claim 1, characterized in that said movable valve member has, in an area disposed between said round cylindrical projection and said frustoconical portion, a projection having a prismatic straight cross-section which can exactly be inscribed in a circle having a diameter equal to the greater diameter of said round cylindrical cavity and thus having at least three portions of external generating lines in contact with said cylindrical cavity along a length equal to the contact diameter.

5. A hydraulic regulating valve according to claim 1, characterized in that said movable valve member has, in an area disposed between said round cylindrical projection and said frustoconical portion, a projection having a prismatic straight cross-section which can exactly be inscribed in a circle whose diameter equals the larger diameter of said round cylindrical cavity, which projection, through its slides relative to the walls of said cylindrical cavity, is always positioned between said radial passageway ports and said sharp edge corner of said cylindrical cavity on which said frustoconical portion seats and provides a restricted cross-section for the flow of a fluid through said cavity and thus makes the movement of said valve member regular.

6. A hydraulic regulating valve according to claim 1, characterized in that said frustoconical portion has a cone apex angle of 60 degrees, said frustoconical portion is sufficiently developed as to offer a circular cross-sectional straight area wider than the cross-sectional area of said cylindrical cavity, said frustoconical portion when sliding relative to said cavity can penetrate the cavity only in part, and said frustoconical member in cooperation with the sharp corner edge of said cylindrical cavity defines an annularly-shaped passageway port of variable width which in certain conditions can even be nil with a seal being formed against the outflow of hydraulic fluid from said cylindrical cavity.

7. A hydraulic regulating valve according to claim 1, characterized in that said movable valve member has an axial bore which establishes a hydraulic communication between that portion of said cavity between said closure wall and said cylindrical projection and the surface of said movable member which is external to said cylindrical cavity.

8. A hydraulic regulating valve according to claim 1, characterized in that said movable valve member is subjected to axial traction forces to that portion thereof disposed between said round cylindrical projection and said frustoconical portion when fluid under pressure is fed to said cylindrical cavity through said radial passageway ports.

9. A hydraulic regulating valve according to claim 1, characterized in that said cavity portions are separated by an annularly shaped passageway, and said movable valve member is subjected to a hydraulic thrust directed in the axial direction and which is proportional to the pressure differential of hydraulic fluid upstream and downstream of said annularly shaped passageway and to the area differential between the greater diameter cross-section and the lesser diameter cross-section of said cylindrical cavity.

10. A hydraulic regulating valve according to claim 1, characterized in that said movable valve member has a portion outside said cylindrical cavity in the shape of a solid of rotation connected to said frustoconical portion a diameter which is higher than the other diameters of said movable valve member, which portion defines a radial flange.

11. A hydraulic regulating valve according to claim 1, characterized in that said pressure-tight cylinder is closed in its portion away from said valve body by a thick-walled wall which has a bore in which a mechanical assembly is housed, said mechanical assembly defining means for the venting of air which has possibly been trapped with the hydraulic fluid in said pressure-tight cylinder.

12. A hydraulic regulating valve according to claim 1, characterized in that said fixed magnetic counter-armature occupies the portion of said pressure-tight cylinder adjacent to said valve body and cooperates with said pressure-tight cylinder to define a chamber within which said movable magnetic armature slides and in which hydraulic fluid is generally present irrespective of the conditions of hydraulic fluid flow through said valve body.

13. A hydraulic regulating valve according to claim 1, characterized in that said magnetic-counter-armature has the shape of a solid of rotation having an outside diameter equal to the inside diameter of said pressure-tight cylinder, said magnetic-counter-armature has a flange which radially extends outside said pressure-tight cylinder, and there are pressure-sealing means between said valve body and said magnetic counter-armature.

14. A hydraulic regulating valve according to claim 13, characterized in that said pressure-tight cylinder has at its end towards said valve body a shaped enlarged portion which is equipped with sealing means and is compressed between said flange of said counter-armature and a flange secured to said valve body by means of screws, thus providing an accurate positioning with respect to one another of said fixed valve member, said counter-armature and said pressure-tight cylinder and obtaining by compression the seal between said valve body, said magnetic counter-armature and said pressure-tight cylinder.

15. A hydraulic regulating valve according to claim 1, characterized in that said sealing means are rings of rubber and like materials affording adequate properties of resiliency and chemical resistance with respect to the used hydraulic fluids.

16. A hydraulic regulating valve according to claim 1, characterized in that said movable magnetic armature has its side surface in contact with the internal wall of said pressure-tight cylinder and thus acts like a piston.

17. A hydraulic regulating valve according to claim 1, characterized in that said movable magnetic armature in the form of a circular cylinder has at its end directed towards said magnetic counter-armature a reduced diameter projection in the shape of a disc whose thickness equals the difference between the diameters of said magnetic armature and said disc has at least one axial bore therethrough which establishes hydraulic communication between front and rear chambers formed by said movable magnetic armature, when acting like a piston, with said pressure-tight cylinder and said counter-armature.

18. A hydraulic regulating valve according to claim 1, characterized in that said pusher emerges from a chamber defined by said pressure-tight cylinder and said magnetic counter-armature, through said axial bore as formed through said magnetic counter-armature, without having any portion thereof in contact with any fixed component parts of said valve.

19. A hydraulic regulating valve according to claim 1, characterized in that said rod-like pusher is inserted in said movable armature and merely rests against said movable valve member.

20. A hydraulic regulating valve according to claim 1, characterized in that parts of said pressure-tight cylinder include a part of annular form constituted of a diamagnetic material, a part shaped as an annular solid of rotation of a magnetic material, and a part in the shape of a hollow cylinder also made of a magnetic material, said part formed of diamagnetic material being disposed between and brazed to said magnetic material parts.

21. A hydraulic regulating valve according to claim 20, characterized in that said component part in the form of an annular solid of rotation is shaped to define an outer enlargement having sealing means, said fastening means includes a securing flange, said counter-armature having a flange, and said enlargement being compressed between the securing flange and the flange of said counter-armature.

22. A hydraulic regulating valve according to claim 20, characterized in that said part of a diamagnetic material which has a longitudinal wall cross-section similar to a rectangular trapezium with an oblique side inclined through about 15 degrees with respect to the base and oriented towards the end of said pressure-tight cylinder which extends towards said valve body.

23. A hydraulic regulating valve according to claim 22, characterized in that said component part of annular shape of a diamagnetic material has such a position with respect to fixed component parts of said valve that a plane lying on the circular surface of said magnetic counter-armature cuts said annular part of a diamagnetic material about at the midpoint of said oblique side.

24. A hydraulic regulating valve according to claim 1, characterized in that said energization coil is contained in a housing separate from said pressure-tight cylinder.

25. A hydraulic regulating valve according to claim 1, characterized in that in said hydraulic valve the electric coiling is separately mounted for removal without exposing to air said movable magnetic armature.

26. A hydraulic regulating valve according to claim 1, characterized in that said electric energization coiling is made integral with said magnetic yoke by an encapsulation of a plastics material of the epoxy resin type and the like.

27. A hydraulic regulating valve according to claim 26, characterized in that electric connection means are provided between said energization coiling and a source of electricity, said electric connection means being on an outer surface of the encapsulation.

* * * * *